US009893967B1

(12) United States Patent
Tressler

(10) Patent No.: US 9,893,967 B1
(45) Date of Patent: Feb. 13, 2018

(54) MEASURING NETWORK EFFICIENCY

(71) Applicant: HRL Laboratories, LLC, Malibu, CA (US)

(72) Inventor: Eric P. Tressler, Washington, DC (US)

(73) Assignee: HRL Laboratories, LLC, Malibu, CA (US)

( * ) Notice: Subject to any disclaimer, the term of this patent is extended or adjusted under 35 U.S.C. 154(b) by 84 days.

(21) Appl. No.: 15/153,359

(22) Filed: May 12, 2016

Related U.S. Application Data

(60) Provisional application No. 62/161,412, filed on May 14, 2015.

(51) Int. Cl.
*H04L 12/26* (2006.01)

(52) U.S. Cl.
CPC .......... *H04L 43/08* (2013.01); *H04L 43/045* (2013.01)

(58) Field of Classification Search
CPC . H04L 41/0823; H04L 41/0836; H04L 41/12; H04L 41/22; H04L 29/08315; H04L 67/1042; H04L 67/1053; H04L 12/18; H04L 2012/5623; H04L 2012/5625; H04L 2012/5626; H04L 45/02; H04W 24/02; H04W 84/10
See application file for complete search history.

(56) References Cited

U.S. PATENT DOCUMENTS

| | | | | |
|---|---|---|---|---|
| 6,490,244 B1* | 12/2002 | Pegrum | ................... | H04L 45/02 370/216 |
| 6,760,310 B1* | 7/2004 | Sofman | ................ | H04L 41/145 370/238 |
| 2006/0140111 A1* | 6/2006 | Vasseur | ................... | H04L 45/02 370/216 |
| 2009/0276510 A1* | 11/2009 | Manthoulis | ........... | H04L 41/145 709/220 |
| 2010/0332991 A1* | 12/2010 | Banerjee | ................. | H04L 41/12 715/736 |
| 2013/0163471 A1* | 6/2013 | Indukuri | ................ | G06Q 10/00 370/255 |
| 2013/0339352 A1* | 12/2013 | Jin | .................... | G06F 17/30958 707/736 |
| 2016/0253605 A1* | 9/2016 | Zou | .................... | G06Q 10/0633 705/7.26 |

OTHER PUBLICATIONS

Reuven Cohen, Keren Erez, Daniel, ben-Avraham, Shlomo Havlin (Nov. 20, 2000). "Resilience of the Internet to Random Breakdowns". Physical Review Letters 85 (21): pp. 4626-4628.

(Continued)

*Primary Examiner* — Mohamed Kamara
(74) *Attorney, Agent, or Firm* — Tope-McKay & Associates

(57) ABSTRACT

Described is a graph measure that generalizes average path length for measuring network efficiency. A reachability measure for a graph representing a network is determined. The reachability measure is a generalized measurement related to an average path length of the graph which provides a measure of a number of short paths in the graph. The reachability measure is applied to an existing network infrastructure to provide a metric for the efficiency of the existing network infrastructure. The existing network infrastructure can then be improved based on the reachability measure.

15 Claims, 7 Drawing Sheets

(56) References Cited

OTHER PUBLICATIONS

Reuven Cohen, Keren Erez. Daniel ben-Avraham, Shlomo Havlin (Apr. 16, 2001). "Breakdown of the Internet under Intentional Attack", Physical Review Letters 86 (16): pp. 3682-3685.
Bastian M., Heymann S., Jacomy M. (2009). Gephi: an open source software for exploring and manipulating networks. International AAAI Conference on Weblogs and Social Media, pp. 361-362.
Christian M, Schneider, Andrè A. Moreira, José S. Andrade., Jr., Shlomo Havlin. and Hans J. Herrmann, (2011) Mitigation of malicious attacks on networks. PNAS 2011 108 (10): pp. 3838-3841.
S. Kirkpatrick, C. D. Gelatt, Jr., M. P. Vecchi (1983). Optimization by Simulated Annealing. Science 220 (4598): pp. 671-682.
Graphml, Airlines Dataset obtained from h t t p s :/ / github.com/ gephi/gephi/wiki/Datasets. Retrieved Mar. 31, 2016.

\* cited by examiner

MEASURING NETWORK EFFICIENCY

CROSS-REFERENCE TO RELATED APPLICATIONS

This is a Non-Provisional Application of U.S. Provisional Patent Application No. 62/161,412, filed in the United States on May 14, 2015, entitled "Measuring Graph Resilience," the entirety of which is incorporated herein by reference.

BACKGROUND OF INVENTION (1) Field of Invention

The present invention relates to a system for measuring efficiency of communication or transportation through a network and, more particularly, to a system for measuring efficiency in a network using a measure that generalizes the network's average path length.

(2) Description of Related Art

Average path length (in the classical sense) is a general way to measure the efficiency of communication within a graph. Shorter average paths between vertices correspond to shorter distances or fewer intermediary steps for communication between one vertex and another. The usual measurement of average path length can become degenerate if several pairs of vertices are very distant from each other in a graph, though, when in fact the graph may be very efficient overall.

The classical notion of average path length is that all pairs of vertices are considered, their path lengths computed, and then averaged using the arithmetic mean. This has several disadvantages, as path lengths can be infinite, rendering the metric useless or inconvenient in some cases.

Thus, a continuing need exists for a metric that deals with infinite path length and optimizes a network to provide short average path length, producing networks which are more efficient.

SUMMARY OF THE INVENTION

The present invention relates to a system for measuring efficiency of communication or transportation through a network and, more particularly, to a system for measuring efficiency in a network using a measure that generalizes the network's average path length. The system comprises one or more processors and a memory having instructions such that when the instructions are executed, the one or more processors perform multiple operations. A reachability measure is determined for a graph, the graph representing a network and having a plurality of vertices and edges. The reachability measure is a generalized measurement related to an average path length of the graph, where reachability gives a measure of a number of short paths in the graph. The reachability measure is applied to an existing network infrastructure and serves as a metric for the efficiency of the existing network infrastructure. The existing network infrastructure can then be improved based on the reachability measure.

In another aspect, the reachability measure is determined according to the following:

$$R_{\alpha,k}(G) = \frac{1}{n(n-1)} \sum_{v \neq w} \frac{1_{d(v,w)>k} - 1_{d(v,w) \leq k}}{d(v,w)^\alpha},$$

wherein n represents the number of vertices, G represents the graph, d(v,w) represents the shortest path distance between vertices v and w, k represents a tunable parameter, $1$ represents an indicator function, and $\alpha$ represents another tunable parameter.

In another aspect, a graph that optimizes the reachability measure is produced to generate a more efficient network.

In another aspect, a reachability measure for each of at least two graphs is determined, wherein the reachability measure normalizes an average path length of each graph to be near 1. The efficiency of the at least two graphs is compared by comparing the determined reachability measures.

In another aspect, the reachability measure is determined for a graph representing a network of airline connections, the graph designed by a user. Airline connections are added or removed based on the reachability measure, and the design of the graph representing the network of airline connections is altered until a desired efficiency is reached.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
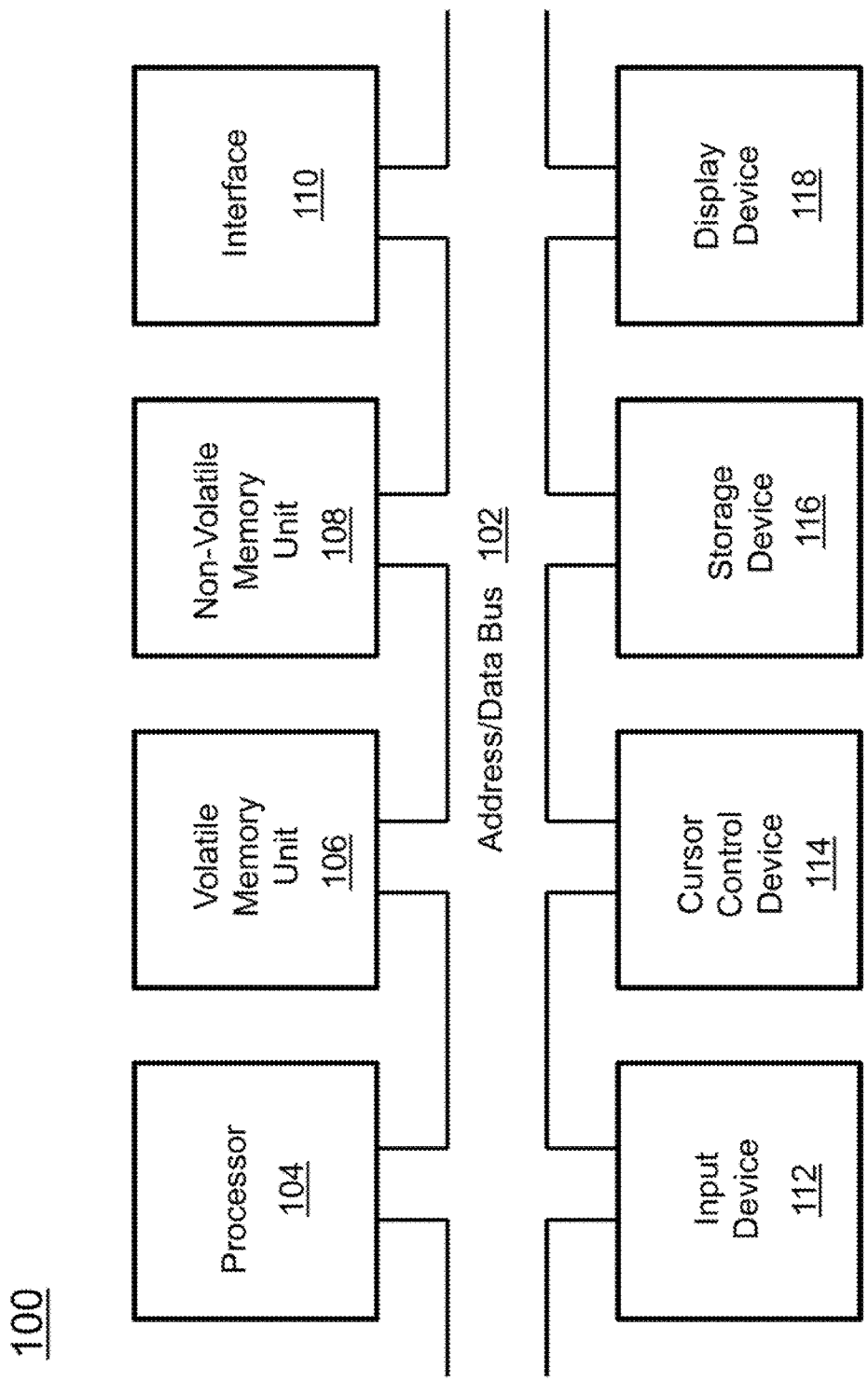
FIG. 1 is a block diagram depicting the components of a system for measuring network efficiency according to various embodiments of the present disclosure.

The present invention relates to a system for measuring efficiency of communication or transportation through a network and, more particularly, to a system for measuring efficiency in a network using a measure that generalizes the network's average path length. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Following that is an introduction that provides an overview of the present invention. Finally, specific details of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully included herein. The references are cited in the application by referring to the corresponding literature reference number, as follows:

1. Reuven Cohen, Keren Erez, Daniel, ben-Avraham, Shlomo Havlin (2000-11-20). "Resilience of the Internet to Random Breakdowns". Physical Review Letters 85 (21): 4626-4628.
2. Reuven Cohen, Keren Erez, Daniel ben-Avraham, Shlomo Havlin (2001-4-16). "Breakdown of the Internet under Intentional Attack". Physical Review Letters 86 (16): 3682-3685.
3. Bastian M., Heymann S., Jacomy M. (2009). Gephi: an open source software for exploring and manipulating networks. International AAAI Conference on Weblogs and Social Media.
4. Christian M. Schneider, André A. Moreira, José S. Andrade, Jr., Shlomo Havlin, and Hans J. Herrmann. (2011) Mitigation of malicious attacks on networks. PNAS 2011 108 (10): 3838-3841.
5. S. Kirkpatrick, C. D. Gelatt, Jr., M. P. Vecchi (1983). Optimization by Simulated Annealing. Science 220 (4598): 671-682.
6. GRAPHML, Airlines Dataset obtained from https://github.com/gephi/gephi/wiki/Datasets. Retrieved Mar. 31, 2016.

(2) Principal Aspects

The present invention has three "principal" aspects. The first is a system for measuring network efficiency. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM ("EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. For example, the input device 112 may include one or more sensors, such as a camera for video or still images, a microphone, or a neural sensor. Other example input devices 112 may include an accelerometer, a GPS sensor, or a gyroscope.

In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
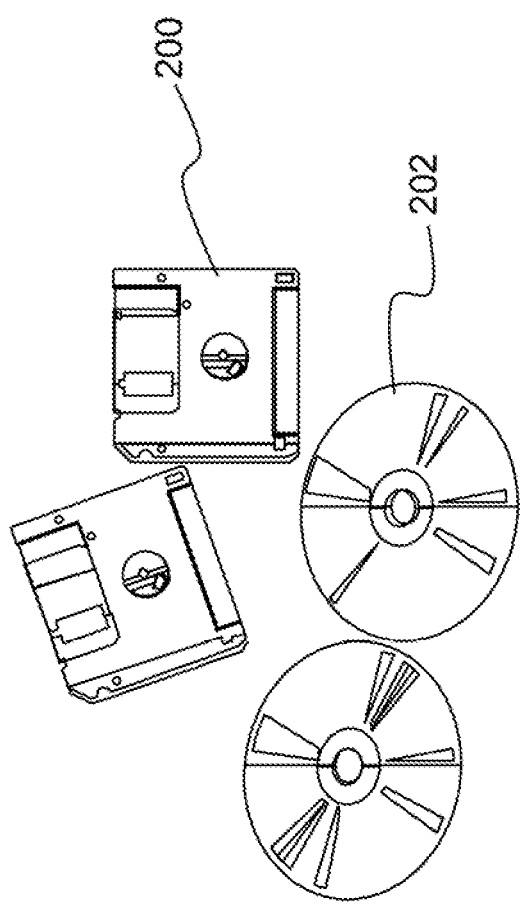
FIG. 2 is an illustration of a computer program product according to various embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

Described is a unique measure, termed "reachability," that gives a generalized measurement of the average distance between two nodes in a graph, known as the average path length of a graph. The classical notion of average path length is that all pairs of vertices of a graph are considered, their path lengths computed, and then averaged using the arithmetic mean. This has several disadvantages since path lengths can be infinite, rendering the metric useless or inconvenient in some cases. The reachability metric according to embodiments of the present disclosure deals with infinite path length and normalizes the average path length to be near 1, allowing one to compare dramatically different graphs. Moreover, reachability has a parameter that allows long paths to either be artificially weighed as a greater or lesser burden on the network.

Average path length (in the classical sense) is a general way to measure the efficiency of communication within a graph. Shorter average paths between vertices correspond to shorter distances or fewer intermediary steps for communication between one vertex and another. The usual measurement of average path length can become degenerate if several pairs of vertices are very distant from each other in a graph, though, when in fact the graph may be very efficient overall. For instance, the highway system in the continental United States allows for fast travel between any two major cities, with few exits from the highway to join another highway. Conversely, travelling between two remote locations may require a large number of turns. Here, the interchange between two highways can be thought to represent a node.

If one were to include Hawaii in the United States highway system example, the average path length becomes infinite, giving a useless measurement of the efficacy of the U.S. highway system. The reachability measure according to embodiments of the present disclosure avoids this pitfall. Reachability can also be used when constructing graphs in order to make them more resistant to attack or random failure. For example, the power grid is a graph constructed by humans to have certain properties. A desired property is having few intermediate steps between individual power plants and the residential users they supply with power. If a major transmission line were to fail, one would like this property of having few intermediate steps to be maintained as well as possible. Constructing graphs with high reachability helps to make this desirable property more likely.

Schneider et al. (see Literature Reference No. 4) gives a graph measure that seeks to prevent graphs from being disconnected after targeted attacks on vertices. By contrast, the reachability metric described herein optimizes a network to provide short average path length and, instead, produces networks which are resistant to random and targeted attacks on edges. This makes reachability a useful metric when building wired computer networks and power grids, when failure of central computers and failure of power plants are of less concern than failure of transmission lines.

(4) Specific Details

For a graph G=G(V,E), where V is the set of vertices and E is the set of edges, the distance between two vertices v and w is defined to be the length of the shortest path between them (if it exists), where the path length measures the number of edges that need to be traversed to reach w from v. If no path exists, then one considers the distance to be undefined. In the sums below, these terms are ignored.

The reachability measure is defined as:

$$R_{\alpha,k}(G) = \frac{1}{n(n-1)} \sum_{v \neq w} \frac{1_{d(v,w)>k} \cdot 1_{d(v,w) \leq k}}{d(v,w)^{\alpha}},$$

wherein n represents the number of vertices, G represents the graph, d(v,w) represents the shortest path distance between vertices v and w, k represents a tunable parameter, 1 represents the indicator function, and α represents another tunable parameter. A non-limiting example of the indicator function is $1_{d(v,w)>k}=1$ if d(v,w)>k and 0 otherwise.

The reachability measure is related to the classical average path length, $l_G$, formula:

$$l_G = \frac{1}{n(n-1)} \sum_{v \neq w} d(v,w).$$

The average path length measures the average shortest distance between any two vertices in a graph, while reachability gives a measure of the number of short paths.

Reachability increases as the graph becomes more well-connected, making it useful in several ways. In an applied context, this means that in a communications network or transportation network, a high reachability implies that, in general, there are few intermediate steps between destinations. When designing or modifying a network, this helps one to make choices to improve communication.

The parameters α and k also play a role in exactly what reachability is measuring. In one embodiment, k is fixed to be 0. When α is 0, the measure is determined by the sizes of the connected components. A connected component is a subset of vertices for which each pair of vertices is connected by at least one path. As α increases, neighbors (i.e., vertices connected by one edge) always contribute 1 to the sum, but longer paths contribute less and less, so that a larger α (in general, α>1) tends to result in a few central vertices surrounded by nodes of very low degree when reachability is maximized.

The flexibility of the parameter α allows for various properties of degree distribution to be controlled. General simulated annealing techniques (such as that described in Literature Reference No. 5) can be used to take a given graph and modify it in a way that will (nearly) maximize reachability. The basic process is to measure reachability, and then randomly swap an edge for a non-edge, and then measure reachability again. If the new value is larger, the change is accepted; otherwise it is rejected. This is repeated m times, where m is arbitrary.

The parameter k plays a different role. As noted above, for k=0, hub nodes (i.e., nodes of unusually large degree) tend to contribute to high reachability, because they allow their neighbors to communicate quickly with other nodes by sending messages through the hub. Although a communication network is provided as a non-limiting example, one skilled in the art can appreciate that the invention described herein extends to other types of networks as well. Sometimes hub nodes are undesirable. For instance, if a network can potentially face an attack, the existence of a hub node makes the whole network vulnerable. If the hub is destroyed, it can cripple the network.

The parameter k penalizes hub nodes. For k=1, reachability is instead maximized when there are many short paths of length at least 2; when k=2, reachability is maximized when there are many short paths of length at least 3. In general, reachability with parameters α and k is maximized when there are many paths as short as possible, but of length at least k+1. This is illustrated by the results of a simulation described below.

(4.1) Simulation

Figure 3:
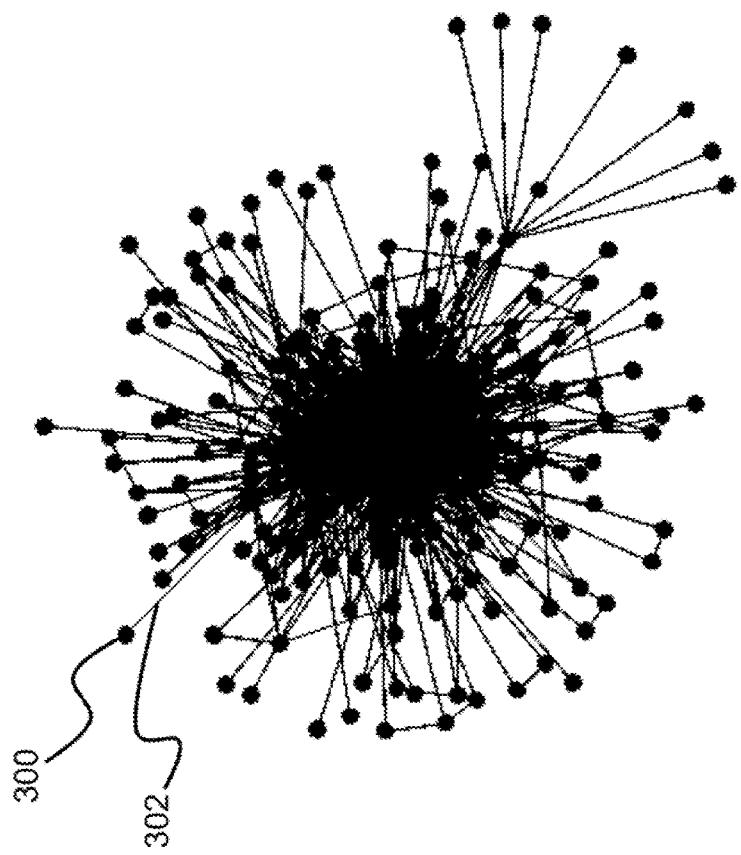
FIG. 3 is an illustration of an airline route graph according to various embodiments of the present disclosure.

A simulation was performed on a set of 235 cities and 1297 routes representing an airline carrier's routes (see Literature Reference No. 6 for the routes). The graph illustrated in FIG. 3 was taken as the starting graph of the original airline data, which was then optimized for reachability under several pairs of parameter values. In FIG. 3, nodes 300 are represented by circles and connections 302 between nodes 300 are represented by lines. This is not intended to give a more optimal routing configuration for the airline, as it ignores distances between cities, the sizes of the respective airports, and the local populations. Instead, this graph was chosen as a typical real-world graph with a typical degree distribution. The emphasis is on the resulting graphs after they have been optimized for reachability. The original airline graph data gives an average path length of 2.318 edges.

The simulated annealing algorithm was performed on the graph depicted in FIG. 3 for several pairs of parameters α and k. Three examples, depicted in FIGS. 4A-6B, are described below to demonstrate the variety of graphs generated by optimizing connections using reachability as a fitness function. As part of the simulated annealing optimization, edges were swapped at random until a configuration was reached with maximal reachability.

Figure 4A:
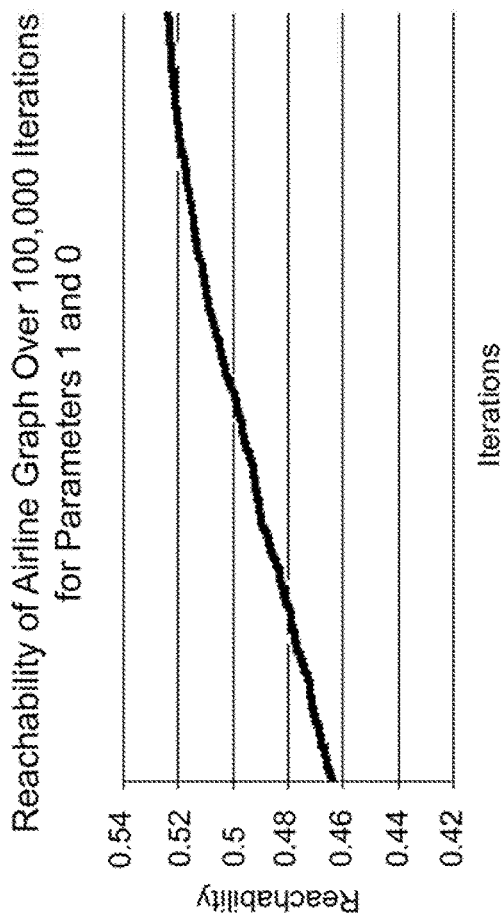
FIG. 4A is a plot illustrating the effects of a simulated annealing algorithm on reachability for parameters 1 and 0 according to various embodiments of the present disclosure.
Figure 4B:
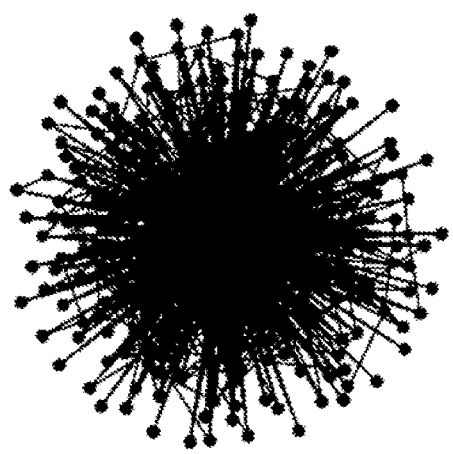
FIG. 4B is a graph illustrating the results in FIG. 4A according to various embodiments of the present disclosure.

First, $\alpha=1$ and $k=0$ was used, which can be regarded as the default case. The edge-swapping optimization was performed for 100,000 iterations, over which the growth of $R_{\alpha,k}$, (reachability) is shown in the plot in FIG. 4A. The resultant graph is shown in FIG. 4B. This graph (FIG. 4B) has average path length 1.953 edges and diameter 2 edges.

Figure 5A:
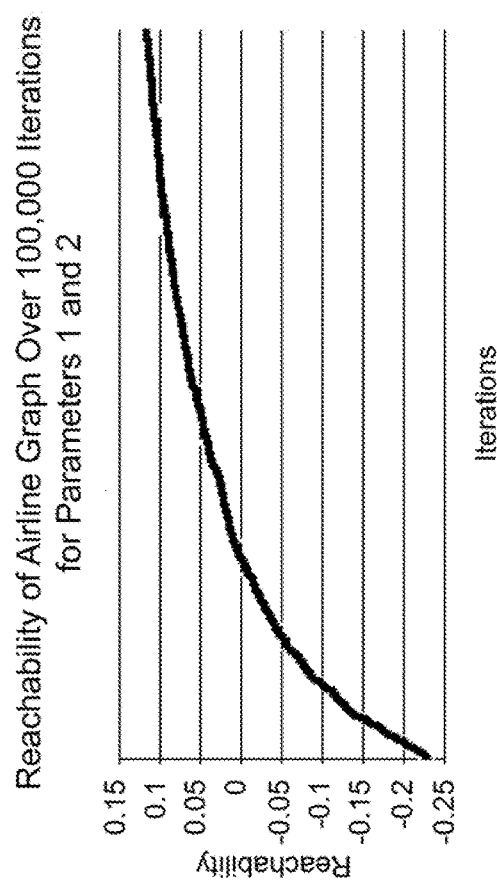
FIG. 5A is a plot illustrating the effects of a simulated annealing algorithm on reachability for parameters 1 and 2 according to various embodiments of the present disclosure.
Figure 5B:
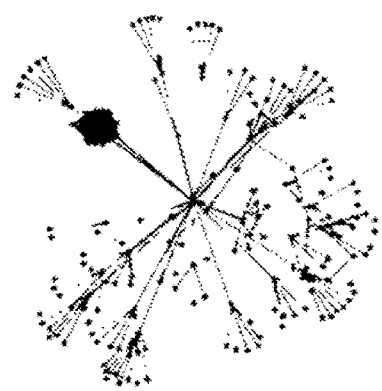
FIG. 5B is a graph illustrating the results in FIG. 5A according to various embodiments of the present disclosure.

FIGS. 5A and 5B show the results of the same process for parameter pair $\alpha=1$ and $k=2$, yielding a graph (FIG. 5B) with average path length 3.511 edges, diameter 4 edges, and radius 2 edges. The edge-swapping optimization was performed for 100,000 iterations, over which the growth of $R_{\alpha,k}$, (reachability) is shown in the plot in FIG. 5A.

Figure 6A:
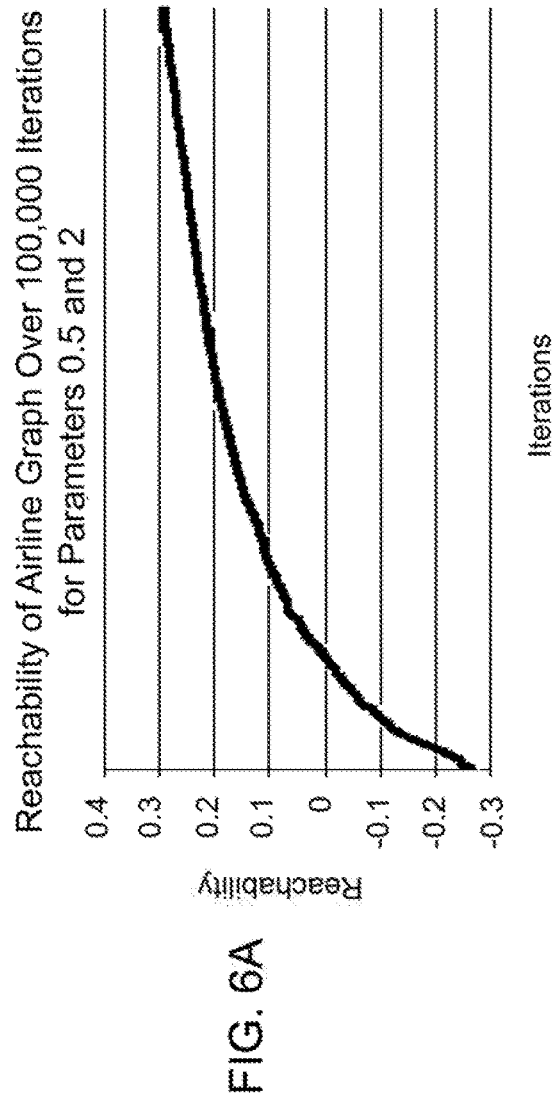
FIG. 6A is a plot illustrating the effects of a simulated annealing algorithm on reachability for parameters 0.5 and 2 according to various embodiments of the present disclosure.
Figure 6B:
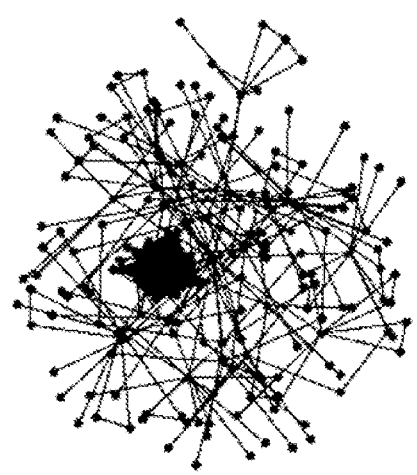
FIG. 6B is a graph illustrating the results in FIG. 6A according to various embodiments of the present disclosure.

Again, this process was repeated for parameter pair $\alpha=0.5$ and $k=2$, resulting in the graph in FIG. 6B, yielding a graph with average path length 3.53 edges, diameter 5 edges, and radius 3 edges. The edge-swapping optimization was performed for 100,000 iterations, over which the growth of $R_{\alpha,k}$, (reachability) for the parameter pair is shown in the plot in FIG. 6A.

The graphs in FIGS. 4B, 5B, and 6B were depicted using a well-known graph visualization algorithm and the computer software package Gephi (see Literature Reference No. 3).

Clearly, parameter k works to avoid short paths, but also yields graphs with different properties when $k=0$ and when $k>1$. Since the number of paths of length 1 is fixed, the graphs produced by $k=0$ and $k=1$ are identical. These simulations demonstrate the differences in the resulting graph as the parameters $\alpha$ and k change, and also that the reachability measure is a viable method to use in constructing networks with small average path length.

The reachability measure described herein improves on current art by the addition of added flexibility. Optimizing a network for maximum reachability gives the network several advantages in terms of efficiency, which can be fine-tuned by adjusting the two parameters $\alpha$ and k. The particular resulting networks are not available by any other means, and by judicious choices of the parameters, a network with near-optimal efficiency in terms of average path length and decentralization can be constructed.

Figure 7:
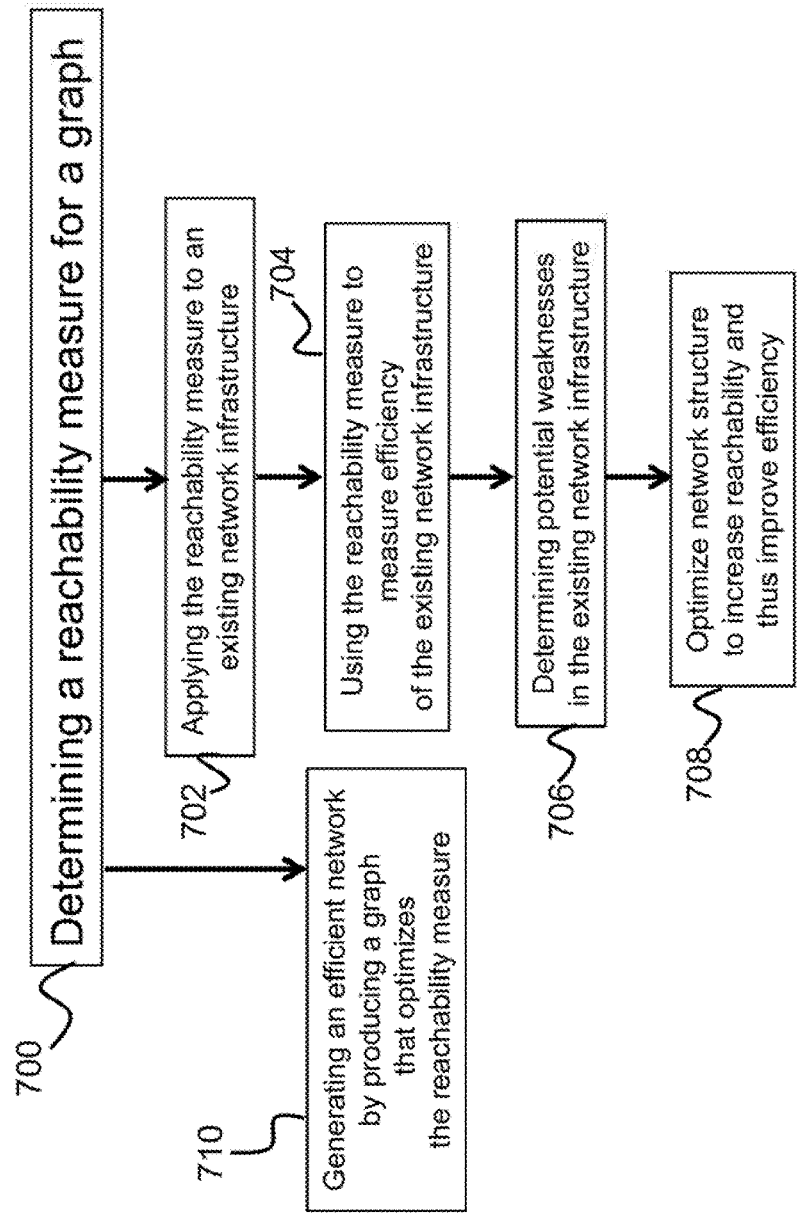
FIG. 7 is a flow diagram illustrating examples of the use of the reachability measure according to various embodiments of the present disclosure.

FIG. 7 is a flow diagram depicting examples of the use of the reachability measure. In a first process 700, a reachability measure is determined for a graph. In a second process 702, the reachability measure is applied to an existing network infrastructure. The reachability measure is used to measure efficiency of the existing network infrastructure in a third process 704. In a fourth process 706, the system determines potential weaknesses in the existing network infrastructure. A low reachability indicates a potential weakness. The network can then be optimized (element 708) to improve its efficiency by adding links that increase the reachability measure. These links are communication or transportation links, such as an ethernet cable between two routers. Another example is an airline connection between two airports. Additionally, the determined reachability measure (element 700) can be used to generate an efficient network by producing a graph that optimizes the reachability measure (element 710). For instance, using an example of a graph representing a network of airline connections, the present invention provides a measure to quantify the number of short routes (i.e., routes with no or few stops) and a means to optimize this number by adding or removing individual airline connections between two airports. In application, a user would design a route map (i.e., graph), use the present invention to compute the reachability measure (i.e., number of short routes), and alter the design until an optimal efficiency is reached.

The reachability measure could be applied to any existing network infrastructure to ensure that random faults or malicious attacks do not result in complete system failure, with respect to long or infinite transmission times. It can similarly be applied to any network, such as networks of cars via Bluetooth or of unmanned aerial vehicles (UAVs) in the field. Ideally, fault in one UAV that causes it to lose communication with others in the area should degrade overall network performance as little as possible. The invention described herein can also be used to determine potential weaknesses in existing networks, whether hostile or unintentional. Additionally, the reachability measure according to embodiments of the present disclosure can be used to select future power plants or locations of transformers.

In another embodiment, the present invention is used to improve reliability of networked hardware. In this embodiment, physical hardware changes are made to get better reliability of the hardware. Non-limiting examples of hardware include power grids, networks of cars or UAVs, and computer networks. As noted above, for $k=0$, hub nodes (i.e., nodes of unusually large degree) tend to contribute to high reachability, because they allow their neighbors to communicate quickly with other nodes by sending messages through the hub. Thus, to improve reliability of networked hardware by contributing to high reachability, additional hub nodes (physical network nodes) could be added to a power grid or network (e.g., computer, cell phone, network of vehicles communicating).

In a power grid, the nodes can be electrical generators and end users, while the edges can be power lines, substations, and transformers. In the example of an Internet network (such as a wireless network between vehicles or cell phones), nodes are represented by computers/mobile devices (e.g., cell phones) and edges by routers and Ethernet cables. By manipulating the composition and connections within a given network as described above, reliability of the hardware and its connections can be improved.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for measuring network efficiency, the system comprising:
one or more processors and a non-transitory computer-readable medium having executable instructions encoded thereon such that when executed, the one or more processors perform operations of:
determining a reachability measure for a graph, the graph representing a network and having a plurality of vertices and edges, wherein the reachability measure is a generalized measurement related to an average path length of the graph which provides a measure of a number of short paths in the graph;

applying the reachability measure to an existing network infrastructure to provide a metric for the efficiency of the existing network infrastructure; and improving the efficiency of the existing network infrastructure based on the reachability measure.

2. The system as set forth in claim 1, wherein the reachability measure is determined according to the following:

$$R_{\alpha,k}(G) = \frac{1}{n(n-1)} \sum_{v \neq w} \frac{\mathbb{1}_{d(v,w)>k} - \mathbb{1}_{d(v,w)\leq k}}{d(v,w)^\alpha},$$

wherein n represents the number of vertices, G represents the graph, d(v,w) represents the shortest path distance between vertices v and w, k represents a tunable parameter, $\mathbb{1}$ represents an indicator function, and $\alpha$ represents another tunable parameter.

3. The system as set forth in claim 1, wherein the one or more processors further perform an operation of producing a graph that optimizes the reachability measure to generate a more efficient network.

4. The system as set forth in claim 1, wherein the one or more processors further performs operations of:
determining a reachability measure for each of at least two graphs, wherein the reachability measure normalizes an average path length of each graph to be near 1; and
comparing the efficiency of the at least two graphs by comparing the determined reachability measures.

5. The system as set forth in claim 1, wherein the one or more processors further perform operations of:
determining the reachability measure for a graph representing a network of airline connections, the graph designed by a user;
adding or removing airline connections based on the reachability measure; and
altering the design of the graph representing the network of airline connections until a desired efficiency is reached.

6. A computer-implemented method for measuring network efficiency, comprising:
an act of causing one or more processors to execute instructions stored on a non-transitory memory such that upon execution, the one or more processors perform operations of:
determining a reachability measure for a graph, the graph representing a network and having a plurality of vertices and edges,
wherein the reachability measure is a generalized measurement related to an average path length of the graph which provides a measure of a number of short paths in the graph;
applying the reachability measure to an existing network infrastructure to provide a metric for the efficiency of the existing network infrastructure; and
improving the efficiency of the existing network infrastructure based on the reachability measure.

7. The method as set forth in claim 6, wherein the reachability measure is determined according to the following:

$$R_{\alpha,k}(G) = \frac{1}{n(n-1)} \sum_{v \neq w} \frac{\mathbb{1}_{d(v,w)>k} - \mathbb{1}_{d(v,w)\leq k}}{d(v,w)^\alpha},$$

wherein n represents the number of vertices, G represents the graph, d(v,w) represents the shortest path distance between vertices v and w, k represents a tunable parameter, $\mathbb{1}$ represents an indicator function, and $\alpha$ represents another tunable parameter.

8. The method as set forth in claim 6, wherein the one or more processors further perform an operation of producing a graph that optimizes the reachability measure to generate a more efficient network.

9. The method as set forth in claim 6, wherein the one or more processors further perform operations of:
determining a reachability measure for each of at least two graphs, wherein the reachability measure normalizes an average path length of each graph to be near 1; and
comparing the efficiency of the at least two graphs by comparing the determined reachability measures.

10. The method as set forth in claim 6, wherein the one or more processors further perform operations of:
determining the reachability measure for a graph representing a network of airline connections, the graph designed by a user;
adding or removing airline connections based on the reachability measure; and
altering the design of the graph representing the network of airline connections until a desired efficiency is reached.

11. A computer program product for measuring network efficiency, the computer program product comprising:
computer-readable instructions stored on a non-transitory computer-readable medium that are executable by a computer having one or more processors for causing the processor to perform operations of:
determining a reachability measure for a graph, the graph representing a network and having a plurality of vertices and edges,
wherein the reachability measure is a generalized measurement related to an average path length of the graph which provides a measure of a number of short paths in the graph;
applying the reachability measure to an existing network infrastructure to provide a metric for the efficiency of the existing network infrastructure; and
improving the efficiency of the existing network infrastructure based on the reachability measure.

12. The computer program product as set forth in claim 11, wherein the reachability measure is determined according to the following:

$$R_{\alpha,k}(G) = \frac{1}{n(n-1)} \sum_{v \neq w} \frac{\mathbb{1}_{d(v,w)>k} - \mathbb{1}_{d(v,w)\leq k}}{d(v,w)^\alpha},$$

wherein n represents the number of vertices, G represents the graph, d(v,w) represents the shortest path distance between vertices v and w, k represents a tunable parameter, $\mathbb{1}$ represents an indicator function, and $\alpha$ represents another tunable parameter.

13. The computer program product as set forth in claim 11, further comprising instructions for causing the one or more processors to perform an operation of producing a graph that optimizes the reachability measure to generate a more efficient network.

14. The computer program product as set forth in claim 11, further comprising instructions for causing the one or more processors to perform operations of:
   determining a reachability measure for each of at least two graphs, wherein the reachability measure normalizes an average path length of each graph to be near 1; and
   comparing the efficiency of the at least two graphs by comparing the determined reachability measures.

15. The computer program product as set forth in claim 11, further comprising instructions for causing the one or more processors to perform operations of:
   determining the reachability measure for a graph representing a network of airline connections, the graph designed by a user;
   adding or removing airline connections based on the reachability measure; and
   altering the design of the graph representing the network of airline connections until a desired efficiency is reached.

\* \* \* \* \*